(12) United States Patent
Boutoille et al.

(10) Patent No.: US 7,964,549 B2
(45) Date of Patent: Jun. 21, 2011

(54) MULTI-COMPARTMENT POUCH

(75) Inventors: Alice Michele Boutoille, Brussels (BE); Florence Catherine Courchay, Brussels (BE); Michael Alan John Moss, Woluwe St. Pierre (BE); Pandora Sifnioti, Brussels (BE)

(73) Assignee: The Procter & Gamble Company, Cincinnati, OH (US)

( * ) Notice: Subject to any disclaimer, the term of this patent is extended or adjusted under 35 U.S.C. 154(b) by 14 days.

(21) Appl. No.: 12/482,473

(22) Filed: Jun. 11, 2009

(65) Prior Publication Data

US 2009/0312220 A1 Dec. 17, 2009

(30) Foreign Application Priority Data

Jun. 13, 2008 (EP) .................................. 08 158 232.2

(51) Int. Cl.
*C11D 17/04* (2006.01)
*C11D 3/42* (2006.01)
(52) U.S. Cl. ......... 510/296; 510/324; 510/394; 510/439
(58) Field of Classification Search .................. 510/296, 510/394, 439, 324
See application file for complete search history.

(56) References Cited

U.S. PATENT DOCUMENTS

| | | | | |
|---|---|---|---|---|
| 4,601,725 A | * | 7/1986 | Keller et al. | 8/403 |
| 4,775,748 A | * | 10/1988 | Kluger et al. | 534/729 |
| 4,912,203 A | * | 3/1990 | Kluger et al. | 534/729 |
| 6,608,015 B2 | * | 8/2003 | Busch et al. | 510/311 |
| 6,878,679 B2 | * | 4/2005 | Sommerville-Roberts et al. | 510/296 |
| 2002/0169092 A1 | * | 11/2002 | Catlin et al. | 510/220 |
| 2005/0282725 A1 | * | 12/2005 | Dasque et al. | 510/446 |
| 2006/0217288 A1 | | 9/2006 | Wahl et al. | |
| 2006/0258553 A1 | * | 11/2006 | Catalfamo et al. | 510/302 |
| 2007/0259170 A1 | * | 11/2007 | Brown et al. | 428/313.3 |
| 2007/0269651 A1 | * | 11/2007 | Denome et al. | 428/327 |
| 2008/0014393 A1 | * | 1/2008 | Denome et al. | 428/35.7 |
| 2008/0177089 A1 | * | 7/2008 | Sadlowski et al. | 549/68 |
| 2008/0235884 A1 | * | 10/2008 | Sadlowski et al. | 8/442 |
| 2009/0286709 A1 | * | 11/2009 | Sadlowski et al. | 510/324 |

FOREIGN PATENT DOCUMENTS

| | | |
|---|---|---|
| EP | 1 201 744 A | 5/2002 |
| WO | WO 2006/004876 A | 1/2006 |
| WO | WO 2006/120405 A | 11/2006 |
| WO | WO 2007/084729 A | 7/2007 |
| WO | WO 2007/111887 A | 10/2007 |

OTHER PUBLICATIONS

EPO International Search Report Dated Nov. 25, 2008—4 pgs, (EP 08158232).

* cited by examiner

*Primary Examiner* — Lorna M Douyon

(74) *Attorney, Agent, or Firm* — Julie A. McConihay; Ronald T. Sia; Leonard W. Lewis

(57) ABSTRACT

A multi-compartment pouch suitable for use in a laundry application comprising a water-soluble film and having at least a first and a second compartment, wherein each compartment comprises a composition, characterized in that the second compartment comprises a whitening agent that exhibits a hueing efficiency of at least 5 and a wash removal value in the range of from about 30% to about 95%.

7 Claims, No Drawings

MULTI-COMPARTMENT POUCH

TECHNICAL FIELD

The present invention relates to a multi-compartment pouch comprising at least a first compartment and a second compartment, wherein the second compartment comprises a whitening agent suitable for use in laundry applications. The whitening agent exhibits a hueing efficiency of at least 5 and a wash removal value in the range of from about 30% to about 95%. The whitening agent preferably comprises at least two components: at least one chromophore component and at least one polymeric component and are particularly effective on cellulosic substrates.

BACKGROUND

The use of whitening agents, either optical brighteners or blueing agents, in textile applications is well known in the prior art. As textile substrates age, their color tends to fade or yellow due to exposure to light, air, soil, and natural degradation of the fibers that comprise the substrates. Thus, the purpose of whitening agents is generally to visually brighten these textile substrates and counteract the fading and yellowing of the substrates. Typically, whitening agents may be found in laundry detergents, fabric softeners, or rinse aids and are therefore applied to textile substrates during the laundering process. However, it is important that whitening agents function to brighten treated textile substrates without causing undesirable staining.

Cellulosic substrates, in particular, tend to exhibit a yellow hue after exposure to light, air, and/or soiling. This yellowness is often difficult to reverse by normal laundering procedures. As a result, there exists a need for improved whitening agents which are capable of eliminating the yellowness exhibited by ageing textile substrates, and in particular cellulosic substrates. By utilizing such improved whitening agents, the life of the textile substrates, such as clothing articles, table linens, etc., may be extended.

The whitening agents of the present invention offer advantages over the prior art, including U.S. Pat. No. 4,137,243, U.S. Pat. No. 5,039,782 and US2005/0288206 as they take advantage of compounds having a hueing efficiency of at least 5 and a wash removal value in the range of from about 30% to about 95%. Such compounds can emit light with wavelengths in the range of blue, red, violet, purple, or combinations thereof upon exposure to ultraviolet light (or, they absorb light to produce the same shades) in order to neutralize the yellowness of cellulosic substrates. These compounds function ideally as whitening agents for cellulosic substrates and may be incorporated into laundry detergent formulations for use by consumers during the laundering process.

However, whilst the preferred whitening agents exhibit excellent whitening, they also make the composition, in which they are formulated, unappealingly dark. It is therefore an object of the present invention to provide a way to incorporate the high performing whitening agents in a liquid detergent product whilst circumventing this unappealing side effect.

SUMMARY OF THE INVENTION

The present invention relates to a multi-compartment pouch suitable for use in a laundry application comprising a water-soluble film and having at least a first and a second compartment, wherein each compartment comprises a composition and wherein the second compartment comprises a whitening agent that exhibits a hueing efficiency of at least 5 and a wash removal value in the range of from about 30% to about 95%.

In a particularly preferred embodiment, the whitening agent comprises:
(a) at least one chromophore component that comprises a thiophene colorant, and
(b) at least one polymeric component; and
wherein the whitening agent is characterized by the following structure:

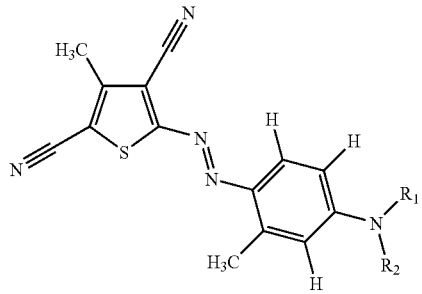

Wherein $R_1$ and $R_2$ can independently be selected from:
a) $[(CH_2CR'HO)_x(CH_2CR''HO)_yH]$
   wherein R' is selected from the group consisting of H, $CH_3$, $CH_2O(CH_2CH_2O)_zH$, and mixtures thereof; wherein R" is selected from the group consisting of H, $CH_2O(CH_2CH_2O)_zH$, and mixtures thereof; wherein $x+y \leq 5$; wherein $y \geq 1$; and
   wherein $z=0$ to 5;
b) $R_1$=alkyl, aryl or aryl alkyl and $R_2=[(CH_2CR'HO)_x(CH_2CR''HO)_yH]$
   wherein R' is selected from the group consisting of H, $CH_3$, $CH_2O(CH_2CH_2O)_zH$, and mixtures thereof; wherein R" is selected from the group consisting of H, $CH_2O(CH_2CH_2O)_zH$, and mixtures thereof; wherein $x+y \leq 10$; wherein $y \geq 1$; and wherein $z=0$ to 5;
c) $R_1=[CH_2CH(OR_3)CH_2OR_4]$ and $R_2=[CH_2CH(OR_3)CH_2OR_4]$
   wherein $R_3$ is selected from the group consisting of H, $(CH_2CH_2O)_zH$, and mixtures thereof; and wherein $z=0$ to 10;
   wherein $R_4$ is selected from the group consisting of ($C_1$-$C_{16}$)alkyl, aryl groups, and mixtures thereof; and
d) wherein R1 and R2 can independently be selected from the amino addition product of styrene oxide, glycidyl methyl ether, isobutyl glycidyl ether, isopropylglycidyl ether, t-butyl glycidyl ether, 2-ethylhexylgycidyl ether, and glycidylhexadecyl ether, followed by the addition of from 1 to 10 alkylene oxide units.

DETAILED DESCRIPTION OF THE INVENTION

As used herein, "cellulosic substrates" are intended to include any substrate which comprises at least a majority by weight of cellulose. Cellulose may be found in wood, cotton, linen, jute, and hemp. Cellulosic substrates may be in the form of powders, fibers, pulp and articles formed from powders, fibers and pulp. Cellulosic fibers, include, without limitation, cotton, rayon (regenerated cellulose), acetate (cellulose acetate), triacetate (cellulose triacetate), and mixtures thereof. Articles formed from cellulosic fibers include textile articles such as fabrics. Articles formed from pulp include paper.

Multi-Compartment Pouch

The detergent product of the present invention is a multi-compartment pouch. The pouch comprises a water soluble film and at least a first and a second compartment. A composition is contained within each of the compartments. The second compartment comprises a composition which itself comprises a whitening agent.

The compartments of the multi-compartment pouch preferably have a different aesthetic appearance. A difference in aesthetics can be achieved in any suitable way. One compartment of the pouch may be made using translucent, transparent, semi-transparent, opaque or semi-opaque film, and the second compartment of the pouch may be made using a different film selected from translucent, transparent, semi-transparent, opaque or semi-opaque film such that the appearance of the compartments is different. The compartments of the pouch may be the same size or volume. Alternatively the compartments of the pouch may have different sizes, with different internal volumes. The compartments may also be different from one another in terms of texture or colour. Hence one compartment may be glossy whilst the other is matt. This can be readily achieved as one side of a water-soluble film is often glossy, whilst the other has a matt finish. Alternatively the film used to make a compartment may be treated in a way so as to emboss, engrave or print the film. Embossing may be achieved by adhering material to the film using any suitable means described in the art. Engraving may be achieved by applying pressure into the film using a suitable technique available in the art. Printing may be achieved using any suitable printer and process available in the art. Alternatively, the film itself may be coloured, allowing the manufacturer to select different coloured films for each compartment. Alternatively the films may be transparent or translucent and the composition contained within may be coloured. Thus in a preferred embodiment of the present invention a first compartment has a colour selected from the group consisting of white, green, blue, orange, red, yellow, pink or purple and a second compartment has a different colour selected from the group consisting of white, yellow, orange, blue or green.

The compartments of the present multi-compartment pouches can be separate, but are preferably conjoined in any suitable manner. Most preferably the second and optionally third or subsequent compartments are superimposed on the first compartment. In one embodiment, the third compartment may be superimposed on the second compartment, which is in turn superimposed on the first compartment in a sandwich configuration. Alternatively the second and third, and optionally subsequent, compartments may all be superimposed on the first compartment. However it is also equally envisaged that the first, second and optionally third and subsequent compartments may be attached to one another in a side by side relationship. In a preferred embodiment the present pouch comprises three compartments consisting of a large and two smaller compartments. The second and third smaller compartments are superposed on the first larger compartment. The size and geometry of the compartments are chosen such that this arrangement is achievable. The compartments may be packed in a string, each compartment being individually separable by a perforation line. Hence each compartment may be individually torn-off from the remainder of the string by the end-user, for example, so as to pre-treat or post treat a fabric with a composition from a compartment.

The geometry of the compartments may be the same or different. In a preferred embodiment the second and optionally third or subsequent compartment has a different geometry and shape to the first compartment. In this embodiment the second and optionally third compartments are arranged in a design on the first compartment. Said design may be decorative, educative, illustrative for example to illustrate a concept or instruction, or used to indicate origin of the product. In a preferred embodiment the first compartment is the largest compartment having two large faces sealed around the perimeter. The second compartment is smaller covering less than 75%, more preferably less than 50% of the surface area of one face of the first compartment. In the embodiment wherein there is a third compartment, the above structure is the same but the second and third compartments cover less than 60%, more preferably less than 50%, even more preferably less than 45% of the surface area of one face of the first compartment.

The multi-compartment pouch is preferably made of a film material which is soluble or dispersible in water, and has a water-solubility of at least 50%, preferably at least 75% or even at least 95%, as measured by the method set out here after using a glass-filter with a maximum pore size of 20 microns:

50 grams±0.1 gram of pouch material is added in a pre-weighed 400 ml beaker and 245 ml±1 ml of distilled water is added. This is stirred vigorously on a magnetic stirrer set at 600 rpm, for 30 minutes. Then, the mixture is filtered through a folded qualitative sintered-glass filter with a pore size as defined above (max. 20 micron). The water is dried off from the collected filtrate by any conventional method, and the weight of the remaining material is determined (which is the dissolved or dispersed fraction). Then, the % solubility or dispersability can be calculated.

Preferred pouch materials are polymeric materials, preferably polymers which are formed into a film or sheet. The pouch material can, for example, be obtained by casting, blow-moulding, extrusion or blown extrusion of the polymeric material, as known in the art.

Preferred polymers, copolymers or derivatives thereof suitable for use as pouch material are selected from polyvinyl alcohols, polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum. More preferred polymers are selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and most preferably selected from polyvinyl alcohols, polyvinyl alcohol copolymers and hydroxypropyl methyl cellulose (HPMC), and combinations thereof. Preferably, the level of polymer in the pouch material, for example a PVA polymer, is at least 60%. The polymer can have any weight average molecular weight, preferably from about 1000 to 1,000,000, more preferably from about 10,000 to 300,000 yet more preferably from about 20,000 to 150,000.

Mixtures of polymers can also be used as the pouch material. This can be beneficial to control the mechanical and/or dissolution properties of the compartments or pouch, depending on the application thereof and the required needs. Suitable mixtures include for example mixtures wherein one polymer has a higher water-solubility than another polymer, and/or one polymer has a higher mechanical strength than another polymer. Also suitable are mixtures of polymers having different weight average molecular weights, for example a mixture of PVA or a copolymer thereof of a weight average molecular weight of about 10,000-40,000, preferably around 20,000, and of PVA or copolymer thereof, with a weight average molecular weight of about 100,000 to 300,000, preferably around 150,000. Also suitable herein are polymer blend compositions, for example comprising hydrolytically degradable and water-soluble polymer blends such as polylactide and polyvinyl alcohol, obtained by mixing polylactide and polyvinyl alcohol, typically comprising about 1-35% by weight polylactide and about 65% to 99% by weight polyvinyl alcohol. Preferred for use herein are polymers which are from about 60% to about 98% hydrolysed, preferably about 80% to about 90% hydrolysed, to improve the dissolution characteristics of the material.

Naturally, different film material and/or films of different thickness may be employed in making the compartments of the present invention. A benefit in selecting different films is that the resulting compartments may exhibit different solubility or release characteristics.

Most preferred pouch materials are PVA films known under the trade reference Monosol M8630, as sold by Chris-Craft Industrial Products of Gary, Ind., US, and PVA films of corresponding solubility and deformability characteristics. Other films suitable for use herein include films known under the trade reference PT film or the K-series of films supplied by Aicello, or VF-HP film supplied by Kuraray.

The pouch material herein can also comprise one or more additive ingredients. For example, it can be beneficial to add plasticisers, for example glycerol, ethylene glycol, diethyleneglycol, propylene glycol, sorbitol and mixtures thereof. Other additives include functional detergent additives to be delivered to the wash water, for example organic polymeric dispersants, etc.

For reasons of deformability pouches or pouch compartments containing a component which is liquid will preferably contain an air bubble having a volume of up to about 50%, preferably up to about 40%, more preferably up to about 30%, more preferably up to about 20%, more preferably up to about 10% of the volume space of said compartment.

Process for Making the Water-Soluble Pouch

The process of the present invention may be made using any suitable equipment and method. However the multi-compartment pouches are preferably made using the horizontal form filling process. The film is preferably wetting, more preferably heated to increase the malleability thereof. Even more preferably, the method also involves the use of a vacuum to draw the film into a suitable mould. The vacuum drawing the film into the mould can be applied for 0.2 to 5 seconds, preferably 0.3 to 3 or even more preferably 0.5 to 1.5 seconds, once the film is on the horizontal portion of the surface. This vacuum may preferably be such that it provides an underpressure of between −100 mbar to −1000 mbar, or even from −200 mbar to −600 mbar.

The moulds, in which the pouches are made, can have any shape, length, width and depth, depending on the required dimensions of the pouches. The moulds can also vary in size and shape from one to another, if desirable. For example, it may be preferred that the volume of the final pouches is between 5 and 300 ml, or even 10 and 150 ml or even 20 and 100 ml and that the mould sizes are adjusted accordingly.

Heat can be applied to the film, in the process commonly known as thermoforming, by any means. For example the film may be heated directly by passing it under a heating element or through hot air, prior to feeding it onto the surface or once on the surface. Alternatively it may be heated indirectly, for example by heating the surface or applying a hot item onto the film. Most preferably the film is heated using an infra red light. The film is preferably heated to a temperature of 50 to 120° C., or even 60 to 90° C. Alternatively, the film can be wetted by any mean, for example directly by spraying a wetting agent (including water, solutions of the film material or plasticizers for the film material) onto the film, prior to feeding it onto the surface or once on the surface, or indirectly by wetting the surface or by applying a wet item onto the film.

In the case of pouches comprising powders it is advantageous to pin prick the film for a number of reasons: firstly, to reduce the possibility of film defects during the pouch formation. For example film defects giving rise to rupture of the film can be generated if the stretching of the film is too fast. Secondly to permit the release of any gases derived from the product enclosed in the pouch, as for example oxygen formation in the case of powders containing bleach. Thirdly, to allow the continuous release of perfume. Moreover, when heat and/or wetting is used, pin pricking can be used before, during or after the use of the vacuum, preferably during or before application of the vacuum. Preferred is thus that each mould comprises one or more holes which are connected to a system which can provide a vacuum through these holes, onto the film above the holes, as described herein in more detail.

Once a film has been heated/wetted, it is drawn into an appropriate mould, preferably using a vacuum. The filling of the moulded film can be done by any known method for filling (moving) items. The most preferred method will depend on the product form and speed of filling required. Preferably the moulded film is filled by in-line filling techniques. The filled, open pouches are then closed, using a second film, by any suitable method. Preferably, this is also done while in horizontal position and in continuous, constant motion. Preferably the closing is done by continuously feeding a second material or film, preferably water-soluble film, over and onto the web of open pouches and then preferably sealing the first film and second film together, typically in the area between the moulds and thus between the pouches.

Preferred methods of sealing include heat sealing, solvent welding, and solvent or wet sealing. It is preferred that only the area which is to form the seal, is treated with heat or solvent. The heat or solvent can be applied by any method, preferably on the closing material, preferably only on the areas which are to form the seal. If solvent or wet sealing or welding is used, it may be preferred that heat is also applied. Preferred wet or solvent sealing/welding methods include applying selectively solvent onto the area between the moulds, or on the closing material, by for example, spraying or printing this onto these areas, and then applying pressure onto these areas, to form the seal. Sealing rolls and belts as described above (optionally also providing heat) can be used, for example.

The formed pouches can then be cut by a cutting device, which cuts the pouches from next. Cutting can be done by any known method. It may be preferred that the cutting is also done in continuous manner, and preferably with constant speed and preferably while in horizontal position. The cutting device can for example be a sharp item or a hot item, whereby in the latter case, the that 'burns' through the film/sealing area.

The different compartments of the pouches of the present invention can be made separately. Alternatively they may be made together in a side-by-side style. In this embodiment, consecutive pouches are not cut. Most preferably the second and optionally third compartments are superimposed on top of the first compartment. Thus according to this latter and preferred arrangement, the pouches are made according to the process comprising the steps of:

a) forming and first compartment (as described above);
b) filling said first compartment with a first composition;

c) placing a second film over the first compartment to form a closed first compartment;
d) forming a recess within some or all of the closed compartment formed in step (c), to generate a second moulded compartment superposed above the first compartment;
e) filling and closing the second compartments by means of a third film;
f) sealing said first, second and third films; and
g) cutting the films to produce a multi-compartment pouch.

Said recess formed in step d is preferably achieved by applying a vacuum to the compartment prepared in steps a) and c).

Alternatively the second, and optionally third, compartments) can be made in a separate step and then combined with the first compartment as described in our co-pending application EP 08101442.5 which is incorporated herein by reference. A particularly preferred process comprises the steps of:
a) forming a first compartment, optionally using heat and/or vacuum, using a first film on a first forming machine;
b) filling said first compartment with a first composition;
c) on a second forming machine, deforming a second film, optionally using heat and vacuum, to make a second and optionally third moulded compartment;
d) filling the second and optionally third compartments;
e) sealing the second and optionally third compartment using a third film;
f) placing the sealed second and optionally third compartments onto the first compartment;
g) sealing the first, second and optionally third compartments; and
h) cutting the films to produce a multi-compartment pouch The first and second forming machines are selected based on their suitability to perform the above process. The first forming machine is preferably a horizontal forming machine. The second forming machine is preferably a rotary drum forming machine, preferably located above the first forming machine.

It will be understood moreover that by the use of appropriate feed stations, it is possible to manufacture multi-compartment pouches incorporating a number of different or distinctive compositions and/or different or distinctive liquid, gel or paste compositions. This can be especially valuable for manufacturing unit dose forms displaying novel visual and/or other sensorial effects.

Detergent Composition

The compositions comprised within the compartments of the pouch of the present invention may be in any form, liquid or solid and anything in between. Hence the composition may be loose powder, densified powder, tablet, liquid, gel or paste. More preferably the composition within the first compartment, the first composition, is any of the above. More preferably the composition within the second compartment, the second composition, is a liquid, paste, waxy or translucent gel. More preferably the composition within a third compartment, the third composition, is a liquid, paste, waxy or translucent gel. Any liquid, paste or gel composition, particularly the second or third compositions, could also contain a separate packed powder, for example in the form of micro-beads, noodles or one or more pearlized balls. Such separate packed powder element may provide a technical benefit such as a pretreat or delayed or sequential release effects. Alternatively it may provide an aesthetic effect.

When the first compartment comprises a tablet, the tablet can have a recess of a size and geometry, (e.g. square, round or oval) so as to partially or totally house the second compartment. In pouches comprising a powder in the first compartment, the powder may form a layer or may be moulded to form a recess suitable for at least partially containing the second composition. A composition comprising powder, may comprise numerous layers of powder that are visually distinct from one another, for example may be coloured differently or contain differently coloured small particles or beads. Preferred multi-compartment pouches comprise a single or multi-phase liquid, paste or waxy or translucent gel detergent. More preferably the first second and optionally third compartments comprise a single or multi-phase liquid, paste or waxy or translucent gel. Where both compartments comprises a single or multi-phase liquid, paste or waxy or translucent gel, it is preferred that each composition is visually distinct from the other wither using colour, viscosity, transparency, pearlescence, the presence of solid particles or beads or mixtures thereof. Either or both of these compartments can also comprise a separate densified powder phase (allowing delayed or controlled release), for example in the form of micro-beads, noodles or one or more pearlized balls.

Especially preferred embodiments of the present multi-compartment pouches comprise a first compartment comprising a first liquid composition, a second compartment comprising a second liquid composition and a third compartment comprising a third liquid composition. The first compartment is preferably the largest and comprises the main wash detergent composition. Said main wash detergent preferably comprises surfactant and solvent amongst other ingredients. In a particular embodiment, said first composition preferably comprises a bleaching system. The second composition comprises the whitening agent. In addition to the whitening agent, the second compartment preferably comprises surfactant, most preferably anionic surfactant and/or solvent. Where present a third composition preferably comprises other incompatible ingredients, such as those discussed below. Alternatively the third composition comprises surfactant and/or water and a non-substantive, detergent colouring, dyes.

The weight ratio of the first and second liquid compositions is preferably from 1:1 to 20:1, more preferably from 1:1 to 10:1. The weight ratio of the second to third composition is from 1:5 to 5:1, more preferably 1:2 to 2. Most preferably the weight ratio of second to third composition is 1:1

The construction of the multi-compartment pouch according to the present invention provides benefits in terms of aesthetic appeal. However the main benefit of said construction is the ability to separate otherwise incompatible ingredients. The whitening agent discussed herein is high performing, but colours the liquid into which it is formulated to such an extent that the composition appears very dark. This is unappealing to the consumer and may even, albeit erroneously, suggest that the composition might stain the fabric being washed. Hence it is an object of the present invention to separate the whitening agent from the main detergent composition as discussed above. In a preferred aspect of the present invention, the first and second compositions are visually distinct from one another. More preferably, as the second composition is dark, it is preferred that the first composition is of a lighter hue. Hence the first composition may comprise a colouring agent to provide a lighter colour and/or may be translucent. In a particularly preferred aspect of the present invention, the first composition comprises a pearlescent agent which not only provides a pearlescent effect to the first composition, but also has the effect of lightening the second composition when the second compartment is overlaid on top of the first compartment.

Other ingredients that could preferably be separated include whitening agents that are sensitive to other constituents of the composition. For example triphenyl methane whitening agents are sensitive to pH, becoming unstable in compositions with pH greater than 9 and Thiazolium whitening agents are not stable in the presence of perfumes. The pH of the composition containing the whitening agent could thus be separated from the main detergent ingredients comprising a higher pH and perfume.

Equally cationic species are incompatible with an overtly anionic composition. Hence for example when a composition comprises high levels of anionic surfactants, cationic surfactants, which provide improved cleaning, or polymers such as deposition aids, can be separated into a different compartment. A bleach system or components of a bleaching system may be other ingredients that could be successfully separated from the main detergent composition. Bleach systems are difficult to formulate in liquid environments as the bleach becomes unstable and/or degrades.

Whitening Agent

The whitening agent is present in the second compartment. The whitening agent of the present invention exhibits a hueing efficiency of at least 5 and a wash removal value in the range of from about 30% to about 95%. Such dyes have been found to exhibit good tinting efficiency during a laundry wash cycle without exhibiting excessive undesirable build up during laundering.

Method for Determination of Hueing Efficiency and Wash Removability:

The hueing efficiency of a dye is measured by comparing a fabric sample washed in a solution containing no dye with a fabric sample washed in a solution containing the dye, and indicates if a hueing dye is effective for providing the desired tinting, for example, whitening. Specifically, a 25 cm×25 cm fabric piece, an example of which may comprise 16 oz white cotton interlock knit fabric (270 g/square meter, brightened with Uvitex BNB fluorescent whitening agent, obtained from Test Fabrics. P.O. Box 26, Weston, Pa., 18643), is employed. Other fabric samples may be used, although it is preferred that white cotton material is employed. The samples are washed in one liter of distilled water containing 1.55 g of AATCC standard test detergent as set forth in Table 1 for 30 minutes at room temperature and rinsed. Respective samples are prepared using a detergent containing no dye (control) and using a detergent containing a wash concentration of a dye to be tested necessary to produce an aqueous solution absorbance of 1 AU. After rinsing and drying each fabric sample, the hueing efficiency, $DE^*_{\mathit{eff}}$, in the wash is assessed by the following equation:

$$DE^*_{\mathit{eff}} = ((L^*_c - L^*_s)^2 + (a^*_c - a^*_s)^2 + (b^*_c - b^*_s)^2)^{1/2}$$

wherein the subscripts c and s respectively refer to the $L^*$, $a^*$, and $b^*$ values measured for the control, i.e., the fabric sample washed in detergent with no dye, and the fabric sample washed in detergent containing the dye to be screened. The $L^*$, $a^*$, and $b^*$ value measurements are carried out using a Hunter Colorquest or Labscan XE reflectance spectrophotometer with D65 illumination, 10° observer and UV filter excluded. Hueing dyes suitable for use in the present invention exhibit a hueing efficiency, $E^*\mathit{eff}$, of at least 5. The wash removal value, $DE^*\mathit{res}$, is an indication of a hueing dye's resistance to build up on a fabric and therefore indicates that the hueing dye, although effective for tinting, will not cause undesirable bluing of fabric after repeated washings. The wash removal value is determined as follows: 15 cm×5 cm sized pieces of the fabric samples resulting from the hueing efficiency test described above are washed in a Launderometer for 45 minutes at 49° C. in 150 ml of the detergent solution set forth in Table 1, according to AATCC Test Method 61-2003, Test 2A. The detergent concentration is 1.55 g/liter of the AATCC HDL formula in distilled water. After rinsing and air drying in the dark, the amount of residual coloration is assessed by measuring the $DE^*_{res}$, given by the following equation:

$$DE^*_{res} = ((L^*_c - L^*_s)^2 + (a^*_c - a^*_s)^2 + (b^*_c - b^*_s)^2)^{1/2}$$

wherein the subscripts c and s respectively refer to the $L^*$, $a^*$, and $b^*$ values measured for the control, i.e., the fabric sample initially washed in detergent with no dye, and the fabric sample initially washed in detergent containing the dye to be screened. The wash removal value for the dye is then calculated according to the formula: % removal=$100 \times (1 - DE^*_{res}/DE^*_{\mathit{eff}})$.

TABLE 1

| Ingredient | weight percent |
|---|---|
| C11.8 linear alkylbenzene sulfonic acid | 12.00 |
| Neodol 23-9 | 8.00 |
| citric acid | 1.20 |
| C12-14 fatty acid | 4.00 |
| sodium hydroxide[1] | 2.65 |
| ethanolamine | 0.13 |
| borax | 1.00 |
| DTPA[2] | 0.30 |
| 1,2-propanediol | 8.00 |
| brightener 15 | 0.04 |
| water | balance |

[1]formula pH adjusted to 8.5
[2]diethylenetriaminepentaacetic acid, pentasodium salt The following structure is a general example of whitening agents according to the invention. Hueing efficiency and wash removability data is available in table 2.

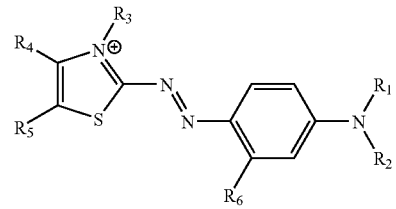

TABLE 2

| Examples | Whitening agent | | | | | | Hueing Efficiency | Wash Removability |
|---|---|---|---|---|---|---|---|---|
| | R1 | R2 | R3 | R4 | R5 | R6 | DE * eff | DE * res |
| 1 | benzyl | CH3 | CH3 | H | H | H | 27.8 | 71.8% |
| 2 | 2EOAc | 3EOAc | CH3 | H | H | CH3 | 23.6 | 71.4% |
| 3 | ethyl | 5EO | CH3 | H | H | CH3 | 23.3 | 72.1% |
| 4 | 2EO | 2EO | CH3 | H | H | H | 21.7 | 71.3% |

TABLE 2-continued

| Examples | Whitening agent | | | | | | Hueing Efficiency DE * eff | Wash Removability DE * res |
| --- | --- | --- | --- | --- | --- | --- | --- | --- |
| | R1 | R2 | R3 | R4 | R5 | R6 | | |
| 5 | 3EO | 3EO | CH3 | H | H | H | 19.1 | 69.0% |
| 6 | benzyl | glycidyl | CH3 | H | H | H | 18.1 | 81.6% |
| 7 | 2EO glycidyl | 3EO glycidyl | CH3 | H | H | CH3 | 15.8 | 75.9% |
| 8 | EOPO | EO2PO | CH3 | H | H | CH3 | 15.8 | 86.8% |
| 9 | benzyl | 10EO | CH3 | H | H | CH3 | 15.7 | 87.8% |
| 10 | EO2PO | EO2PO | CH3 | H | H | H | 15.5 | 84.0% |
| 11 | 5EO | 5EO | CH3 | H | H | CH3 | 15.4 | 86 |
| 12 | glycidyl 2EO | glycidyl 3EO | CH3 | H | H | CH3 | 14.0 | 83.4% |
| 13 | POEO | PO2EO | CH3 | H | H | CH3 | 13.8 | 89.6% |
| 14 | ethyl | 8EO | CH3 | H | H | CH3 | 13.8 | 82.7% |
| 15 | ethyl | 5EO | CH3 | H | H | CH3 | 13.3 | 86.7% |
| 16 | ethyl | 8EO | ethyl | H | H | CH3 | 12.0 | 88.2% |
| 17 | EOPO | EO2PO | ethyl | H | H | CH3 | 11.8 | 92.1% |
| 18 | EO3PO | EO3PO | CH3 | H | H | H | 11.6 | 91.5% |
| 19 | benzyl | glycidyl 5EO | CH3 | H | H | CH3 | 11.5 | 88.0% |
| 20 | glycidyl isopropyl ether 2EO | glycidyl isopropyl ether 3EO | CH3 | H | H | CH3 | 10.5 | 86.4% |
| 21 | benzyl | 10EO | CH3 | H | H | H | 10.4 | 86.4% |

The whitening agents suitable for use in the present detergent compositions exhibit a wash removal value in the range of from about 30% to about 95%. In a more specific embodiment, the whitening agent exhibits a wash removal value in the range of from about 40% to about 85%, alternatively from about 45% to about 85%.

The whitening agent is included in the total laundry detergent composition in an amount sufficient to provide a tinting effect to fabric washed in a solution containing the detergent. In one embodiment, the multi-compartment pouch comprises, by weight, from about 0.0001% to about 1%, more preferably from about 0.0001% to about 0.5% by weight of the composition, and even more preferably from about 0.0001% to about 0.3% by weight of the composition.

More preferably the whitening agents of the present invention comprise a chromophore constituent and a polymeric constituent. The chromophore constituent is characterized in that it emits or absorbs wavelength in the range of blue, red, violet, purple, or combinations thereof upon exposure to light. Preferably, the chromophore constituent exhibits an absorbance spectrum value from about 520 nanometers to about 640 nanometers in water, and more preferably from about 570 nanometers to about 610 nanometers in water. Preferably, the chromophore constituent exhibits an emission spectrum value from about 400 nanometers to about 480 nanometers in water.

Examples of suitable polymeric constituents include polyoxyalkylene chains having multiple repeating units. Preferably the polymeric constituents include polyoxyalkylene chains having from 2 to about 20 repeating units, and more preferably from 2 to about 10 or even from about 4 to about 6 repeating units. Non-limiting examples of polyoxyalkylene chains include ethylene oxide, propylene oxide, glycidol oxide, butylene oxide and mixtures thereof.

Examples of preferred commercially available whitening agents according to the present invention are selected from the list consisting of triarylmethane blue basic dye; a triarylmethane violet basic dye; a methine blue basic dye; a methane violet basic dye; an anthraquinone blue basic dye; an antraquinone violet basic dye; an azo dye basic blue 16, basic blue 65, basic blue 66, basic blue 67, basic blue 71, basic blue 159, basic violet 19, basic violet 35, basic violet 38, or basic violet 48; oxazine dye basic blue 3, basic blue 75, basic blue 95, basic blue 122, basic blue 124, basic blue 141, or Nile blue A; a xanthene dye basic violet 10; an alkoxylated anthraquinone polymeric colorant; alkoxylated thiophene; triphenyl methane; antraquinones; or a mixture thereof.

Preferably the whitening agent is a methine basic blue dye or a methine basic violet dye. Preferably the whitening agent is an alkoxylated anthraquinone polymeric colorant. Preferably the whitening agent is an alkoxylated triphenylmethane polymeric colorant. Preferably the whitening agent is an alkoxylated thiophene polymeric colorant.

A particularly preferred whitening agent of the present invention may be characterized by the following structure:

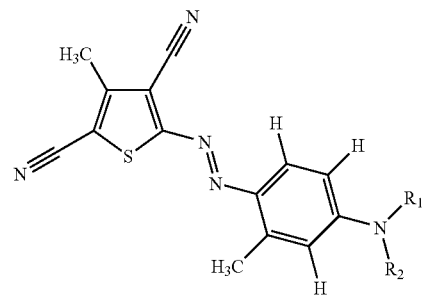

Wherein $R_1$ and $R_2$ can independently be selected from:
a) $[(CH_2CR'HO)_x(CH_2CR''HO)_yH]$
  wherein R' is selected from the group consisting of H, $CH_3$, $CH_2O(CH_2CH_2O)_zH$, and mixtures thereof; wherein R" is selected from the group consisting of H, $CH_2O(CH_2CH_2O)_zH$, and mixtures thereof; wherein $x+y \leqq 5$; wherein $y \geqq 1$; and
  wherein z=0 to 5;
b) $R_1$=alkyl, aryl or aryl alkyl and $R_2$=$[(CH_2CR'HO)_x(CH_2CR''HO)_yH]$
  wherein R' is selected from the group consisting of H, $CH_3$, $CH_2O(CH_2CH_2O)_zH$, and mixtures thereof; wherein R" is selected from the group consisting of H, $CH_2O(CH_2CH_2O)_zH$, and mixtures thereof; wherein $x+y \leqq 10$; wherein $y \geqq 1$; and wherein z=0 to 5;
c) $R_1$=$[CH_2CH_2(OR_3)CH_2OR_4]$ and $R_2$=$[CH_2CH_2(OR_3)CH_2OR_4]$ wherein R$_3$ is selected from the group consisting of H, (CH$_2$CH$_2$O)$_z$H, and mixtures thereof; and wherein z=0 to 10;

wherein R$_4$ is selected from the group consisting of (C$_1$-C$_{16}$)alkyl, aryl groups, and mixtures thereof; and d) wherein R1 and R2 can independently be selected from the amino addition product of styrene oxide, glycidyl methyl ether, isobutyl glycidyl ether, isopropylglycidyl ether, t-butyl glycidyl ether, 2-ethylhexylgycidyl ether, and glycidylhexadecyl ether, followed by the addition of from 1 to 10 alkylene oxide units.

An even more preferred whitening agent of the present invention may be characterized by the following structure:

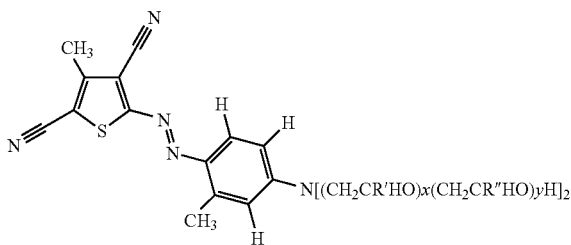

wherein R' is selected from the group consisting of H, CH$_3$, CH$_2$O(CH$_2$CH$_2$O)$_z$H, and mixtures thereof; wherein R" is selected from the group consisting of H, CH$_2$O(CH$_2$CH$_2$O)$_z$H, and mixtures thereof; wherein x+y≦5; wherein y≧1; and wherein z=0 to 5.

The liquid compositions of the present invention may comprise other ingredients selected from the list of optional ingredients set out below. Unless specified herein below, an "effective amount" of a particular laundry adjunct is preferably from 0.01%, more preferably from 0.1%, even more preferably from 1% to 50%, more preferably to 40%, even more preferably to 5% by weight of the detergent compositions.

Optional Detergent Composition Components

The compositions of the present invention may comprise one or more of the ingredients as discussed below.

Surfactants or Detersive Surfactants

The compositions of the present invention preferably comprise from about 1% to 80% by weight of a surfactant. Preferably such compositions comprise from about 5% to 50% by weight of surfactant. More preferably the first composition comprises surfactant. The Second composition preferably does not comprise surfactant.

Detersive surfactants utilized can be of the anionic, nonionic, zwitterionic, ampholytic or cationic type or can comprise compatible mixtures of these types. More preferably surfactants are selected from the group consisting of anionic, nonionic, cationic surfactants and mixtures thereof. Preferably the compositions are substantially free of betaine surfactants. Detergent surfactants useful herein are described in U.S. Pat. No. 3,664,961, Norris, issued May 23, 1972, U.S. Pat. No. 3,919,678, Laughlin et al., issued Dec. 30, 1975, U.S. Pat. No. 4,222,905, Cockrell, issued Sep. 16, 1980, and in U.S. Pat. No. 4,239,659, Murphy, issued Dec. 16, 1980. Anionic and nonionic surfactants are preferred.

Useful anionic surfactants can themselves be of several different types. For example, water-soluble salts of the higher fatty acids, i.e., "soaps", are useful anionic surfactants in the compositions herein. This includes alkali metal soaps such as the sodium, potassium, ammonium, and alkyl ammonium salts of higher fatty acids containing from about 8 to about 24 carbon atoms, and preferably from about 12 to about 18 carbon atoms. Soaps can be made by direct saponification of fats and oils or by the neutralization of free fatty acids. Particularly useful are the sodium and potassium salts of the mixtures of fatty acids derived from coconut oil and tallow, i.e., sodium or potassium tallow and coconut soap.

Additional non-soap anionic surfactants which are suitable for use herein include the water-soluble salts, preferably the alkali metal, and ammonium salts, of organic sulfuric reaction products having in their molecular structure an alkyl group containing from about 10 to about 20 carbon atoms and a sulfonic acid or sulfuric acid ester group. (Included in the term "alkyl" is the alkyl portion of acyl groups.) Examples of this group of synthetic surfactants are a) the sodium, potassium and ammonium alkyl sulfates, especially those obtained by sulfating the higher alcohols (C$_8$-C$_{18}$ carbon atoms) such as those produced by reducing the glycerides of tallow or coconut oil; b) the sodium, potassium and ammonium alkyl polyethoxylate sulfates, particularly those in which the alkyl group contains from 10 to 22, preferably from 12 to 18 carbon atoms, and wherein the polyethoxylate chain contains from 1 to 15, preferably 1 to 6 ethoxylate moieties; and c) the sodium and potassium alkylbenzene sulfonates in which the alkyl group contains from about 9 to about 15 carbon atoms, in straight chain or branched chain configuration, e.g., those of the type described in U.S. Pat. Nos. 2,220,099 and 2,477,383. Especially valuable are linear straight chain alkylbenzene sulfonates in which the average number of carbon atoms in the alkyl group is from about 11 to 13, abbreviated as C$_{11}$-C$_{13}$ LAS.

Preferred nonionic surfactants are those of the formula R$^1$(OC$_2$H$_4$)$_n$OH, wherein R$^1$ is a C$_{10}$-C$_{16}$ alkyl group or a C$_8$-C$_{12}$ alkyl phenyl group, and n is from 3 to about 80. Particularly preferred are condensation products of C$_{12}$-C$_{15}$ alcohols with from about 5 to about 20 moles of ethylene oxide per mole of alcohol, e.g., C$_{12}$-C$_{13}$ alcohol condensed with about 6.5 moles of ethylene oxide per mole of alcohol.

Fabric Care Benefit Agents

The compositions may comprise a fabric care benefit agent. As used herein, "fabric care benefit agent" refers to any material that can provide fabric care benefits such as fabric softening, color protection, pill/fuzz reduction, anti-abrasion, anti-wrinkle, and the like to garments and fabrics, particularly on cotton and cotton-rich garments and fabrics, when an adequate amount of the material is present on the garment/fabric. Non-limiting examples of fabric care benefit agents include cationic surfactants, silicones, polyolefin waxes, latexes, oily sugar derivatives, cationic polysaccharides, polyurethanes, fatty acids and mixtures thereof. Fabric care benefit agents when present in the composition, are suitably at levels of up to about 30% by weight of the composition, more typically from about 1% to about 20%, preferably from about 2% to about 10%.

Detersive Enzymes

Suitable detersive enzymes for use herein include protease, amylase, lipase, cellulase, carbohydrase including mannanase and endoglucanase, and mixtures thereof. Enzymes can be used at their art-taught levels, for example at levels recommended by suppliers such as Novo and Genencor. Typical levels in the compositions are from about 0.0001% to about 5%. When enzymes are present, they can be used at very low levels, e.g., from about 0.001% or lower, in certain embodiments of the invention; or they can be used in heavier-duty laundry detergent formulations in accordance with the invention at higher levels, e.g., about 0.1% and higher. In accordance with a preference of some consumers for "non-biological" detergents, the present invention includes both enzyme-containing and enzyme-free embodiments.

Deposition Aid

As used herein, "deposition aid" refers to any cationic polymer or combination of cationic polymers that significantly enhance the deposition of a fabric care benefit agent onto the fabric during laundering.

Preferably, the deposition aid is a cationic or amphoteric polymer. The amphoteric polymers of the present invention will also have a net cationic charge, i.e.; the total cationic charges on these polymers will exceed the total anionic charge. Nonlimiting examples of deposition enhancing agents are cationic polysaccharides, chitosan and its derivatives and cationic synthetic polymers. Preferred cationic polysaccharides include cationic cellulose derivatives, cationic guar gum derivatives, chitosan and derivatives and cationic starches.

Rheology Modifier

In a preferred embodiment of the present invention, the composition comprises a rheology modifier. The rheology modifier is selected from the group consisting of non-polymeric crystalline, hydroxy-functional materials, polymeric rheology modifiers which impart shear thinning characteristics to the aqueous liquid matrix of the composition. Crystalline, hydroxy-functional materials are rheology modifiers which form thread-like structuring systems throughout the matrix of the composition upon in situ crystallization in the matrix. Specific examples of preferred crystalline, hydroxyl-containing rheology modifiers include castor oil and its derivatives. Especially preferred are hydrogenated castor oil derivatives such as hydrogenated castor oil and hydrogenated castor wax. Commercially available, castor oil-based, crystalline, hydroxyl-containing rheology modifiers include THIXCIN® from Rheox, Inc. (now Elementis). Polymeric rheology modifiers are preferably selected from polyacrylates, polymeric gums, other non-gum polysaccharides, and combinations of these polymeric materials. Preferred polymeric gum materials include pectine, alginate, arabinogalactan (gum Arabic), carrageenan, gellan gum, xanthan gum, guar gum and mixtures thereof.

Builder

The compositions of the present invention may optionally comprise a builder. Suitable builders include polycarboxylate builders include cyclic compounds, particularly alicyclic compounds, such as those described in U.S. Pat. Nos. 3,923,679; 3,835,163; 4,158,635; 4,120,874 and 4,102,903. Particularly preferred are citrate builders, e.g., citric acid and soluble salts thereof (particularly sodium salt Other preferred builders include ethylene diamine disuccinic acid and salts thereof (ethylene diamine disuccinates, EDDS), ethylene diamine tetraacetic acid and salts thereof (ethylene diamine tetraacetates, EDTA), and diethylene triamine penta acetic acid and salts thereof (diethylene triamine penta acetates, DTPA), aluminosilicates such as zeolite A, B or MAP; fatty acids or salts, preferably sodium salts, thereof, preferably C12-C18 saturated and/or unsaturated fatty acids; and alkali or alkali earth metal carbonates preferably sodium carbonate.

Bleaching System

Bleaching agents suitable herein include chlorine and oxygen bleaches, especially inorganic perhydrate salts such as sodium perborate mono- and tetrahydrates and sodium percarbonate optionally coated to provide controlled rate of release (see, for example, GB-A-1466799 on sulfate/carbonate coatings), preformed organic peroxyacids and mixtures thereof with organic peroxyacid bleach precursors and/or transition metal-containing bleach catalysts (especially manganese or cobalt). Inorganic perhydrate salts are typically incorporated at levels in the range from about 1% to about 40% by weight, preferably from about 2% to about 30% by weight and more preferably from abut 5% to about 25% by weight of composition. Peroxyacid bleach precursors preferred for use herein include precursors of perbenzoic acid and substituted perbenzoic acid; cationic peroxyacid precursors; peracetic acid precursors such as TAED, sodium acetoxybenzene sulfonate and pentaacetylglucose; pemonanoic acid precursors such as sodium 3,5,5-trimethylhexanoyloxybenzene sulfonate (iso-NOBS) and sodium nonanoyloxybenzene sulfonate (NOBS); amide substituted alkyl peroxyacid precursors (EP-A-0170386); and benzoxazin peroxyacid precursors (EP-A-0332294 and EP-A-0482807). Bleach precursors are typically incorporated at levels in the range from about 0.5% to about 25%, preferably from about 1% to about 10% by weight of composition while the preformed organic peroxyacids themselves are typically incorporated at levels in the range from 0.5% to 25% by weight, more preferably from 1% to 10% by weight of composition. Bleach catalysts preferred for use herein include the manganese triazacyclononane and related complexes (U.S. Pat. No. 4,246,612, U.S. Pat. No. 5,227,084); Co, Cu, Mn and Fe bispyridylamine and related complexes (U.S. Pat. No. 5,114,611); and pentamine acetate cobalt(III) and related complexes(U.S. Pat. No. 4,810,410).

Perfume

Perfumes are preferably incorporated into the detergent compositions of the present invention. The perfumes may be prepared as a premix liquid, may be linked with a carrier material, such as cyclodextrin or may be encapsulated.

Solvent System

The solvent system in the present compositions can be a solvent system containing water alone or mixtures of organic solvents with water. Preferred organic solvents include 1,2-propanediol, ethanol, glycerol, dipropylene glycol, methyl propane diol and mixtures thereof. Other lower alcohols, $C_1$-$C_4$ alkanolamines such as monoethanolamine and triethanolamine, can also be used. Solvent systems can be absent, for example from anhydrous solid embodiments of the invention, but more typically are present at levels in the range of from about 0.1% to about 98%, preferably at least about 1% to about 50%, more usually from about 5% to about 25%.

Pearlescent Agent

The compositions of the present invention may comprise a pearlescent agent. Said pearlescent agent may be organic or inorganic, but is preferably inorganic. Most preferably the pearlescent agent is selected from mica, TiO2 coated mica, bismuth oxychloride or mixtures thereof.

Other Adjuncts

Examples of other suitable cleaning adjunct materials include, but are not limited to, alkoxylated benzoic acids or salts thereof such as trimethoxy benzoic acid or a salt thereof (TMBA); enzyme stabilizing systems; scavenging agents including fixing agents for anionic dyes, complexing agents for anionic surfactants, and mixtures thereof; optical brighteners or fluorescers; soil release polymers; dispersants; suds suppressors; dyes; colorants; hydrotropes such as toluenesulfonates, cumenesulfonates and naphthalenesulfonates; color speckles; colored beads, spheres or extrudates; clay softening agents and mixtures thereof.

Composition Preparation

The compositions herein can generally be prepared by mixing the ingredients together. If a pearlescent material is used it should be added in the late stages of mixing. If a rheology modifier is used, it is preferred to first form a pre-mix within which the rheology modifier is dispersed in a portion of the water and optionally other ingredients eventually used to comprise the compositions. This pre-mix is formed in such a way that it forms a structured liquid. To this structured pre-mix can then be added, while the pre-mix is under agitation, the surfactant(s) and essential laundry adjunct materials, along with water and whatever optional detergent composition adjuncts are to be used.

Secondary Packaging

The multi-compartment pouches of the present invention are preferably further packaged in an outer package. Said outer package may be a see-through or partially see-through container, for example a transparent or translucent bag, tub, carton or bottle. The pack can be made of plastic or any other suitable material, provided the material is strong enough to protect the pouches during transport. This kind of pack is also very useful because the user does not need to open the pack to see how many pouches there are left. Alternatively, the pack can have non-see-through outer packaging, perhaps with indicia or artwork representing the visually-distinctive contents of the pack.

Process of Washing

The pouches of the present invention are suitable for laundry cleaning applications. The pouches are suitable for hand or machine washing conditions. When machine washing, the pouch may be delivered from the dispensing drawer or may be added directly into the washing machine drum.

EXAMPLES

The present examples are meant to describe embodiments of the present invention. The Multicycle Whiteness test, as used herein, is a measure of the whiteness performance of a detergent composition on multiple types of fabrics. The composition containing a whitening agent can be seen to provide a significant benefit over the variety of fabrics tested, after 1 and 4 cycles. The test protocol is reliable and reproducible and is commonly used in the industry by detergent manufacturers and consumer institutes alike. The test is aimed to represent the real consumer wash conditions.

Multicycle Whiteness Test Method:

This protocol provides an absolute and comparative whiteness assessment of 2 detergents via visual whiteness grading. The test conditions are as follows:

Miele Softronic W467 washing machines are used at 40° C. using the "Crease Resistant" washing cycle (1 hour cycle in total). The 'fuzzy logic' feature is deactivated by the Miele engineer in order to ensure the same volume of water per wash cycle. The water hardness is adjusted to 21 grains per gallon (4 mmol Ca) by topping up the tap water with the required amount of $Ca^{2+}/Mg^{2+}$ at a 3/1 ratio.

The following fabrics whiteness tracers are used in the whiteness test: terry towel, knitted cotton, flat cotton, poly cotton and polyester (as in the results of this example). All samples measure 16 cm×16 cm. In each washing machine there are 3 replicates each of terry towels and T-shirts for single cycle whiteness testing and 12 replicates of each of terry towel, T-shirts and Polyester for multicycle whiteness testing (multicycle being 4 consecutive cycles).

25 g of artificial soil (AS1) is then added to all washing machine cycles and topped with ballast load made of clean 100% white cotton (mix of terry towels, knitted cotton T-shirts and flat cotton sheets). Each machine load will contain the 18 whiteness tracers above (6 single cycles, and 12 multi cycles) and the ballast load, so as to adjust the total dry weight to 2.5 Kg. The machines are used 4 times sequentially in order to assess the whiteness upon multiple cycles.

Before starting the test the ballast load is preconditioned, to remove any factory deposits, protective films or fabric softeners etc, in a Miele Softronic W467 washing machine using the normal cycle for White as follows: 30 C wash with 50 g of a light duty detergent, containing low bleach, low enzyme, normally used to wash delicate garments. In the test herein we used Dreft regular powder (as sold in Belgium), 3 washes at 90° C. with 50 g Dreft regular powder (or other light duty detergent as above) and 3 washes at 90° C. without detergent. The ballast load is then dried in a Miele T490 using the extra dry cycle.

Before the first cycle starts, the dry ballast load is run though the rinse cycle in order to wet the load together with the whiteness tracers at 21gpg water hardness. The same ballast load is reused wet for the next cycle(s) without intermediate drying.

To load the machines, add all multicycle bundles and the single cycle tracers mixed with the load. Place 25 g AS1 in a dosing bowl on top of the load. One Liquitab of each product (the recommended dosage) is added in the drum under the ballast.

Tracer bundles of fabrics are ordered from Warwick EQUEST Limited, an independent fabric supplier: Unit 55, Consett Business Park, Consett, County Durham, DH8 6BN UK Telephone: +44 (0) 1207 584 040 Fax: +44 (0) 1207 584 041

The AS1 artificial soil is ordered from an independent supplier at: wfk Cleaning Technology Research Institute, Campus Fichtenhain 11, D-47807 Krefeld, Germany.

Warwick EQUEST Limited, an independent fabric supplier: Unit 55, Consett Business Park, Consett, County Durham, DH8 6BN UK Telephone: +44 (0) 1207 584 040 Fax: +44 (0) 1207 584 041

All fabrics are graded visually within 48 h after the last washing cycles is finished. The grading must be done simultaneously by two different qualified persons. The grading is a pair comparison between 2 fabrics of the same type and of the same cycle, using a grading scale going from 0 to 4:

| SCORE | MEANING |
| --- | --- |
| 0 | There is no difference |
| 1 | I think this one is better (unsure) |
| 2 | I know this one is better |
| 3 | This one is a lot better |
| 4 | This one is a whole lot better |

Grading Procedure

Lay out the tracers and proceed to grade in pairs, i.e. ensure you are comparing strips washed in the same machine and the same replicate for the two products.

Each grader determines their preference for whiteness. The results are tabulated and assessed statistically. The significance at 95% confidence level is written as a "s" between the two % Preference numbers.

TABLE 1

Liquid detergent compositions according to the invention.

| | A<br>Single | B<br>3 compartments | | | C<br>2 compartments | | D<br>3 compartments | | |
|---|---|---|---|---|---|---|---|---|---|
| Compartment # | compartment | 1 | 2 | 3 | 1 | 2 | 1 | 2 | 3 |
| Dosage (g) | 45.0 | 34.0 | 3.5 | 3.5 | 30.0 | 5.0 | 25.0 | 1.5 | 14.0 |
| Ingredients | | | | | Weight % | | | | |
| Alkylbenzene sulfonic acid | 21.0 | 20.0 | 20.0 | 20.0 | 10.0 | 20.0 | 20.0 | | |
| Alkyl sulfate | | | | | 2.0 | | | | |
| C12-14 alkyl 7-ethoxylate | 18.0 | 17.0 | 17.0 | 17.0 | | 17.0 | 17.0 | | |
| Cationic surfactant | | | | | 1.0 | | | | |
| Zeolite A | | | | | 10.0 | | | | |
| C12-18 Fatty acid | 15.0 | 13.0 | 13.0 | 13.0 | | 18.0 | 18.0 | | |
| Sodium acetate | | | | | 4.0 | | | | |
| enzymes | 0-3 | 0-3 | 0-3 | 0-3 | 0-3 | | 0-3 | | |
| Sodium Percarbonate | | | | | 11.0 | | | | |
| TAED | | | | | 4.0 | | | | |
| Organic catalyst[1] | | | | | 1.0 | | | | |
| PAP granule[2] | | | | | | | | | 50 |
| Polycarboxylate | | | | | 1.0 | | | | |
| Ethoxysulfated Hexamethylene Diamine Dimethyl Quat | 2.0 | 2.2 | 2.2 | 2.2 | | | | | |
| Hydroxyethane diphosphonic acid | 0.5 | 0.6 | 0.6 | 0.6 | 0.5 | | | | |
| Ethylene diamine tetra(methylene phosphonic) acid | | | | | | | 0.4 | | |
| Brightener | 0.2 | 0.2 | 0.2 | 0.2 | 0.3 | | 0.3 | | |
| Mineral oil | | | | | | | | | |
| Whitening agent 3 | | | | 0.05 | | 0.035 | | 0.12 | |
| Perfume | 1.5 | 1.7 | 1.7 | | 0.6 | | 1.5 | | |
| Water and minors (antioxidant, aesthetics, . . . ) | | 10.0 | 10.0 | 10.0 | 4.0 | | | | |
| Buffers (sodium carbonate, monoethanolamine)[4] | | | | | To pH 8.0 for liquids<br>To RA > 5.0 for powders | | | | |
| Solvents (1,2 propanediol, ethanol), Sulfate | | | | | To 100 p | | | | |

[1]Sulfuric acid mono-[2-(3,4-dihydro-isoquinolin-2-yl)-1-(2-ethyl-hexyloxymethyl)-ethyl]ester as described in U.S. Pat. No. 7,169,744
[2]PAP = Phtaloyl-Amino-Peroxycaproic acid, as a 70% active wet cake
[3]Ethoxylated thiophene, EO ($R_1 + R_2$) = 5
[4]RA = Reserve Alkalinity (g NaOH/dose)
A = Soiled sample whiteness after washing with Formula A, B = soiled sample whiteness after washing with Formula B

| Fabric type | 1 Cycle<br>B vs. A | 4 Cycles<br>B vs. A |
|---|---|---|
| Total | 79 s 21 | 83 s 7 |
| Terry | 88 s 12 | 94 s 6 |
| Knitted | 78:22 | 91 s 9 |
| Flat Cotton | 81 s 19 | 100 s 0 |
| Poly Cotton | 84 s 16 | 75:25 |
| Polyester | 62:38 | 56:44 |
| Total whiteness | | 81 s 19 |

Formula A contains 45.0 g of detergent A in a single compartment pouch. Formula B contains 41.0 g of detergent B in a 3-compartment pouch. Details are outlined in Table 1. Detergent formulation B is a compacted version of formulation A, with lower surfactant and builder levels, and topped up with a hueing agent as detailed in this invention. As can be seen from the above data, composition B performs better than formulation A, by providing visibly whiter items after one cycle, and even whiter items after 4 cycles.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A multi-compartment pouch suitable for use in a laundry application comprising a water-soluble film and having at least a first and a second compartment smaller than the first compartment that is superposed over the first compartment, wherein the first compartment comprises a first composition and the second compartment comprises a second composition, characterised in that the second compartment comprises a whitening agent that exhibits a hueing efficiency of at least 5 and a wash removal value in the range of from about 30% to about 95%, as determined by the Method for Determination of Hueing Efficiency and Wash Removability, wherein said whitening agent comprises:
(a) at least one chromophore component that comprises a thiophene colorant, and
(b) at least one polymeric component; and
wherein the whitening agent is characterized by the following structure:

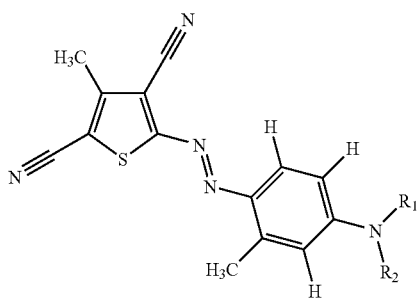

wherein $R_1$ and $R_2$ can independently be selected from:
a) $[(CH_2CR'HO)_x(CH_2CR''HO)_yH]$
wherein R' is $CH_3$, $CH_2$—O—$(CH_2CH_2O)_zH$; wherein R" is selected from the group consisting of H, $CH_2O(CH_2CH_2O)_zH$, and mixtures thereof; wherein $x+y \leq 5$; wherein $y \geq 1$; and
wherein z=0 to 5;
b) $R_1$=alkyl, aryl or aryl alkyl and $R_2=[(CH_2CR'HO)_x(CH_2CR''HO)_yH]$
wherein R' $CH_3$, $CH_2O(CH_2CH_2O)_zH$; wherein R" is selected from the group consisting of H, $CH_2O(CH_2CH_2O)_zH$, and mixtures thereof; wherein $x+y \leq 10$; wherein $y \geq 1$; and
wherein z=0 to 5 and;
c) $R_1=[CH_2CH(OR_3)CH_2OR_4]$ and $R_2=[CH_2CH(OR_3)CH_2OR_4]$
wherein $R_3$ is selected from the group consisting of H, $(CH_2CH_2O)_zH$, and mixtures thereof; and wherein z=0 to 10;
wherein $R_4$ is selected from the group consisting of ($C_1$-$C_{16}$)alkyl, aryl groups, and mixtures thereof; with the proviso that z in a), b), or c) is not 0.

2. The multi-compartment pouch according to claim 1, wherein the whitening agent exhibits a hueing efficiency of at least 15 and a wash removal value in the range of from about 40% to about 85%.

3. The multi-compartment pouch according to claim 1 comprising by weight, (a) from about 5% to about 90% of a surfactant, and (b) from about 0.0001% to about 1% of the whitening agent.

4. The multi-compartment pouch according to claim 1, wherein the whitening agent further comprises a triarylmethane blue basic dye; a triarylmethane violet basic dye; a methine blue basic dye; a methane violet basic dye; an anthraquinone blue basic dye; an anthraquinone violet basic dye; an azo dye basic blue 16, basic blue 65, basic blue 66, basic blue 67, basic blue 71, basic blue 159, basic violet 19, basic violet 35, basic violet 38, or basic violet 48; oxazine dye basic blue 3, basic blue 75, basic blue 95, basic blue 122, basic blue 124, basic blue 141, or Nile blue A; a xanthene dye basic violet 10; an alkoxylated anthraquinone polymeric colorant; alkoxylated thiophene; triphenyl methane; anthraquinones; or a mixture thereof.

5. The multi-compartment pouch according to claim 1 wherein the composition contained in the first compartment is a laundry detergent composition comprising a surfactant.

6. The multi-compartment pouch according to claim 1 wherein the composition in the first compartment comprises ingredients selected from the group consisting of surfactant, builder, solvent, chelant, polymer, pearlescent agent and mixtures thereof.

7. The multi-compartment pouch according to claim 1, wherein the first composition is transparent or translucent or a lighter hue or tone than the second composition.

* * * * *